United States Patent
Botea et al.

(10) Patent No.: US 12,287,810 B2
(45) Date of Patent: Apr. 29, 2025

(54) METHOD FOR EFFICIENT RE-RANKING AND CLASSIFICATION OF AMBIGUOUS INPUTS IN DEEP HIERARCHY

(71) Applicant: Eaton Intelligent Power Limited, Dublin (IE)

(72) Inventors: Adi Botea, Dublin (IE); Chahrazed Bouhini, Dublin (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 68 days.

(21) Appl. No.: 18/004,006

(22) PCT Filed: Dec. 14, 2020

(86) PCT No.: PCT/EP2020/085998
§ 371 (c)(1),
(2) Date: Dec. 30, 2022

(87) PCT Pub. No.: WO2022/008091
PCT Pub. Date: Jan. 13, 2022

(65) Prior Publication Data
US 2023/0259531 A1  Aug. 17, 2023

(30) Foreign Application Priority Data
Jul. 6, 2020 (GB) .................................. 2010307

(51) Int. Cl.
*G06F 16/28* (2019.01)
(52) U.S. Cl.
CPC .......... *G06F 16/285* (2019.01); *G06F 16/282* (2019.01)

(58) Field of Classification Search
CPC .............................. G06F 16/282; G06F 16/285
See application file for complete search history.

(56) References Cited

U.S. PATENT DOCUMENTS 10,268,735 B1 * 4/2019 White .................. G06F 16/9024
2007/0271287 A1 * 11/2007 Acharya ............... G06F 16/285
(Continued)

OTHER PUBLICATIONS

Johnson Justin, et al., "Love Thy Neighbors: Image Annotation by Exploiting Image Metadata", 2015 IEEE International Conference on Computer Vision ( I CCV) , IEEE, Dec. 7, 2015 (Dec. 7, 2015), pp. 4624-4632, XP032866830, DOI: 10.1109/ICCV.2015.525. [retrieved on Feb, 17, 2016] abstract section 3—figure 4.

*Primary Examiner* — Grace Park
(74) *Attorney, Agent, or Firm* — LEYDIG, VOIT & MAYER, LTD.

(57) ABSTRACT

A method for classifying records by relevance to nodes of a hierarchical structure representative of a classification scheme for different classification options. The method includes receiving an input record having a plurality of record content features, and a contextual attribute indicative of a context of the receipt of the input record, retrieving relational data indicative of one or more nodes of the hierarchical structure that are associated with the contextual at-tribute of the received input record, and determining a relevance score for one or more of the nodes of the hierarchical structure to classify the input record. The relevance score of each node is determined in dependence on a comparison of the plurality of record content features of the input record relative to the classification option represented by said node, and further wherein the relevance score of each node depends on the retrieved relational data.

12 Claims, 5 Drawing Sheets

(56) References Cited

U.S. PATENT DOCUMENTS

| | | | |
|---|---|---|---|
| 2016/0070731 A1* | 3/2016 | Chang | G06F 16/285 |
| | | | 707/741 |
| 2016/0203234 A1* | 7/2016 | Piccand | H04W 4/70 |
| | | | 707/798 |
| 2022/0327119 A1* | 10/2022 | Gasper | G06F 16/9024 |

* cited by examiner

METHOD FOR EFFICIENT RE-RANKING AND CLASSIFICATION OF AMBIGUOUS INPUTS IN DEEP HIERARCHY

TECHNICAL FIELD

The present disclosure relates generally to a method for classifying an input record according to a hierarchical structure. In particular, the disclosure relates to efficient (re-) ranking and classification of ambiguous inputs in deep hierarchy. Aspects of the disclosure relate to the classification method, to a controller, and to a non-transitory computer-readable storage medium.

BACKGROUND

It is often desirable to classify recorded data according to a sparse and deep hierarchical structure, such as a tree or a directed acyclic graph. In this manner, the data may be classified at a desired level of detail and the classified data is efficiently searchable and sortable for efficient processing and storage. Such hierarchical structures comprise a series of nodes, or classification options, that are arranged into levels, or branches, connected together by respective edges, or connections. In this manner, each edge in the hierarchical structure connects a higher-level node to a set of more granular nodes on a lower level. This forms a so-called 'parent node' on the higher level and a set of 'child nodes', or more detailed classification options, on the lower level.

Methods for classifying data records into such hierarchical structures are well-known in the art of computer science. However, challenges with classifying data records into such hierarchical structures arise when the nodes at a desired classification level are very similar to one another and/or the recorded data is otherwise difficult to classify into one option or another.

This difficulty in classifying records may mean that an increased number of records need to be classified to construct accurate rankings in the structure. This suffers from being computationally inefficient in that a greater number of inputs and outputs, with a greater number of iterations, need to be processed to obtain rankings. Also, when a record cannot be classified accurately using the known computational methods, time-consuming human intervention may be needed to perform classification, which is undesirable. There is therefore a need for a more accurate and efficient method for classifying records in a hierarchical structure.

It is against this background that this disclosure has been devised.

SUMMARY OF THE DISCLOSURE

According to an aspect of the disclosure there is provided a classification method for classifying records by relevance to nodes of a hierarchical structure representative of a classification scheme for different classification options. The classification method includes receiving an input record having a plurality of record content features, and a contextual attribute indicative of a context of the receipt of the input record. The method includes retrieving relational data indicative of one or more nodes of the hierarchical structure that are associated with the contextual attribute of the received input record. The method also includes determining a relevance score for one or more of the nodes of the hierarchical structure to classify the input record. The relevance score of each of the one or more nodes is determined in dependence on a comparison of the plurality of record content features of the input record relative to the classification option represented by said node. The relevance score of each of the one or more nodes is also determined in dependence on the retrieved relational data.

The classification method may comprise determining the relational data based on a database of historical records.

The relational data may be determined by applying an ontological engineering algorithm to the database of historical records to determine a knowledge graph that models a relevance of contextual attributes of the historical records to the nodes of the hierarchical structure.

The relational data may be determined by applying a semantic reasoning algorithm to the knowledge graph to determine a set of contextual attributes that are logically related to respective nodes of the hierarchical structure.

The relational data may be retrieved in dependence on matching the contextual attribute of the input record to a corresponding contextual attribute selected from the set of contextual attributes determined by the semantic reasoning algorithm.

The knowledge graph may be determined by splitting the database of historical records into one or more subject groups, object groups, and/or predicate groups.

In some examples, determining the relevance score of each of the one or more nodes comprises: determining an initial relevance score in dependence on the comparison of the plurality of record content features of the input record relative to the classification option represented by said node; and by updating that initial relevance score based on the retrieved relational data.

In some examples, increasing, or decreasing, the initial relevance score based on the retrieved relational data comprises: increasing the initial relevance score of a first node at a desired classification level of the hierarchical structure in dependence on the relational data being indicative that the first node is associated with the contextual attribute of the received input record; and, decreasing the initial relevance score for a second node, different from the first node, at the desired classification level.

In some examples, determining the relevance score of each of the one or more nodes comprises: determining a confidence score for the input record that is indicative of an uncertainty in the initial relevance scores; and updating the initial relevance scores in dependence on the determined confidence score.

The relevance score for one or more of the nodes of the hierarchical structure may be determined based, at least in part, on a combination of a local similarity score for that node and a local similarity score for one or more child nodes depending from that node, each local similarity score being indicative of the relevance of the input record to the respective node.

According to another aspect of the present disclosure there is provided a non-transitory, computer-readable storage medium having instructions stored thereon that, when executed by a computer, cause the computer to carry out the classification method described above.

According to another aspect of the present disclosure there is provided a classification system for classifying records by relevance to nodes of a hierarchical structure representative of a classification scheme for a plurality of classification options. The classification system comprising an input module configured to receive an input record having a plurality of record content features, and a contextual attribute indicative of a context of the receipt of the input record. The classification system comprises a relevance assessment module configured to determine a relevance score for one or more of the nodes of the hierarchical structure to classify the input record. The relevance score of each of the one or more nodes is determined in dependence on a comparison of the plurality of record content features of the input record relative to the classification option represented by said node. The relevance score of each of the one or more nodes is also determined in dependence on retrieved relational data that is indicative of one or more nodes of the hierarchical structure that are associated with the contextual attribute of the received input record. The classification system includes an output module configured to output a classification of the input record based on the determined relevance score for one or more of the nodes of the hierarchical structure.

The classification system may further comprise a contextualizing module configured to determine the relational data based on a database of historical records.

The contextualizing module may be configured to determine the relational data by applying an ontological engineering algorithm to the database of historical records to determine a knowledge graph that models the relevance of contextual attributes of the historical records to the nodes of the hierarchical structure.

The contextualizing module may be configured to determine the relational data by applying a semantic reasoning algorithm to the knowledge graph to determine a set of contextual attributes that are logically related to respective nodes of the hierarchical structure.

The contextualizing module may be configured to retrieve the relational data in dependence on matching the contextual attribute of the input record to a corresponding contextual attribute selected from the set of contextual attributes determined by the semantic reasoning algorithm.

It will be appreciated that preferred and/or optional features of each aspect of the disclosure may be incorporated alone or in appropriate combination in the other aspects of the disclosure also.

BRIEF DESCRIPTION OF THE DRAWINGS

Examples of the disclosure will now be described, by way of example only, with reference to the accompanying drawings, in which.

DETAILED DESCRIPTION

Embodiments of the disclosure relate to a classification system, and to a method, for classifying an input record based on its relevance to the nodes of a hierarchical structure, such as a taxonomy of objects.

Each node may represent a respective classification option within a classification scheme and the classification system may be configured to determine a set of scores, referred to as 'relevance scores', that are indicative of the relevance of the input record to the respective nodes. For example, each relevance score may represent a probability that the input record relates to the respective node.

Advantageously, to reduce uncertainty in the determined relevance scores, the classification system is configured to make use of historical records that may be processed to determine (semantically and contextual) relational data, which indicates how a contextual attribute of a received record relates to one or more nodes of the hierarchical structure. For example, the relational data may indicate that an input record received at a particular time, generated from a particular source, or received as part of a particular set of input records, is related to one or more corresponding nodes of the hierarchical structure. Relational data can be semantically and/or contextually related data that can have hidden relevance connections.

The classification system may therefore receive the input record along with a contextual attribute that is indicative of the context of the input record and retrieve corresponding relational data, matched to the contextual attribute, for the purposes of determining the relevance of the input record to the nodes of the hierarchical structure.

In this manner, uncertainty in the determined relevance scores may be reduced and more accurate relevance scores may be determined, as shall become clear in the following.

The contribution of the disclosure may therefore be considered as a classification system and method that uses contextual information, external to a record, in addition to internal information, describing the subject of the record, to classify the record. This arrangement provides enhanced classification capabilities and enables the determination of more accurate relevance scores for each input record.

Figure 1:
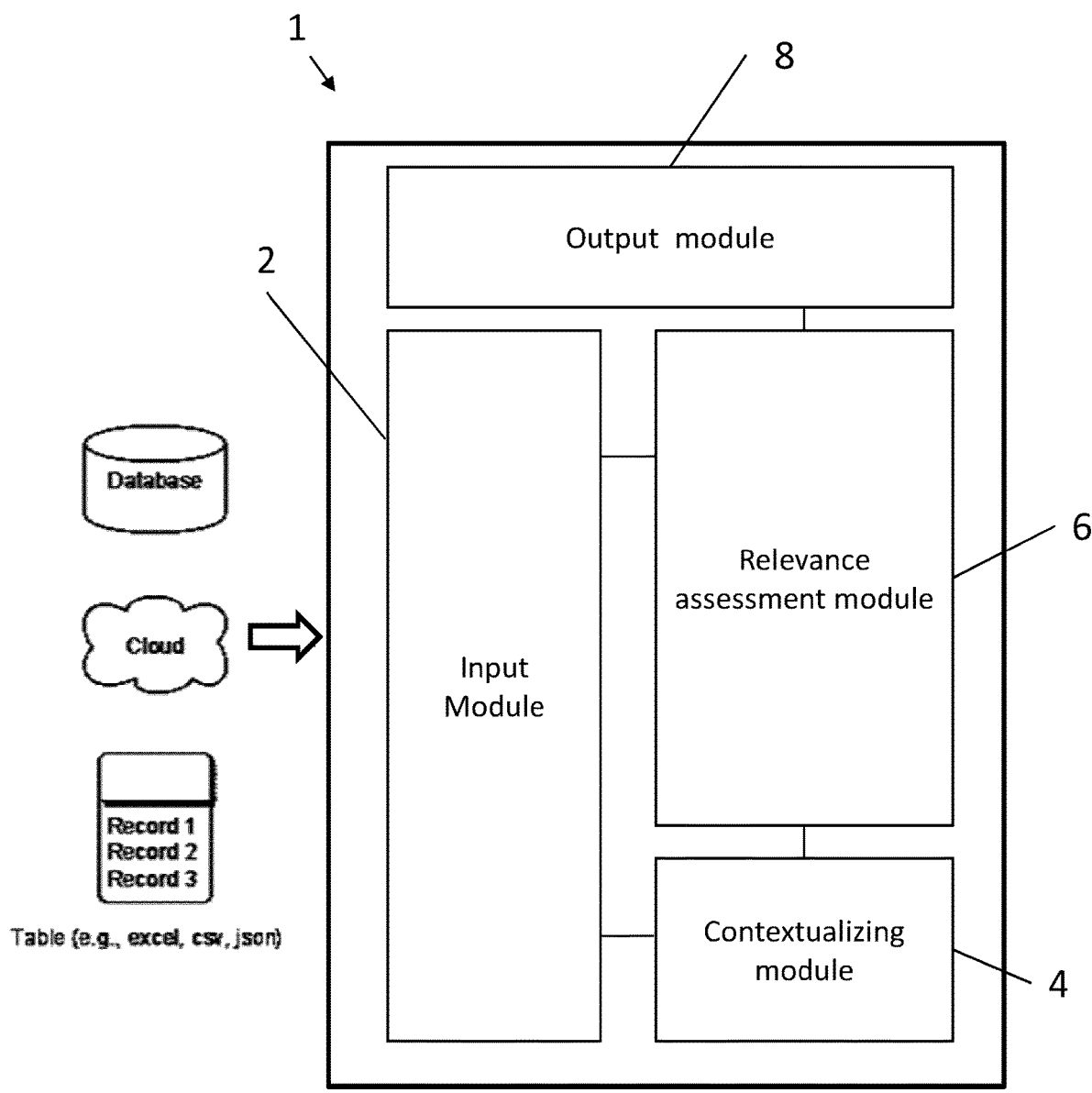
FIG. 1 shows a schematic illustration of an example classification system in accordance with an embodiment of the disclosure.

FIG. 1 schematically illustrates an example classification system 1 for determining the relevance of an input record to a hierarchical structure.

The classification system 1 includes an input module 2, a contextualizing module 4, a relevance assessment module 6, and an output module 8. That is, in the described example four major functional elements, units or modules are shown. Each of these units or modules may be provided by suitable software running on any suitable computing substrate using conventional or customer processors and memory. Some or all of the units or modules may use a common computing substrate (for example, they may run on the same server) or separate substrates, or different combinations of the modules may be distributed between multiple computing devices.

The input module 2 is configured to receive, and/or store, the input record and a contextual attribute for the input record. The input record may relate to an object, event, or transaction, for example, and may include one or more record content features that describe the subject of the input record. For example, the one or more record content features may include an attribute, or value, for a plurality of variables that describe the subject of the input record.

The contextual attribute is indicative of the context of the input record or, in other words, indicates the circumstances in which the input record was generated, or received at the classification system. Hence, the contextual attribute is external to the record content features that describe the subject of the input record, and may indicate a range of relevant contextual information that may define one or more contextual parameters, such as: a source of the input record; a time and/or date of generation, or receipt, of the input record; one or more accompanying input records that said input record was received with, for example as part of a set of input records; and/or the relevance of said one or more accompanying input records to the nodes of the hierarchical structure.

Hence, it shall be appreciated that the contextual attribute may be provided in the form of contextual information that the classification system 1 is capable of deriving the context, or circumstances, of the input record from.

The input module 2 is also configured to receive, and/or store, the hierarchical structure. The hierarchical structure may take different forms in examples of the classification system 1, including the form of a directed acyclic graph, a tree, or a forest of tress and/or directed acyclic graphs.

In each case, the hierarchical structure comprises a plurality of nodes that represent respective classification options for successive tiers of classification, known as classification levels. The plurality of nodes is then connected together, across levels, by respective edges that effectively map the connections between related nodes and form branches between classification options on different classification levels.

In this manner, each edge in the hierarchical structure connects a higher level node to a set of more granular nodes on a lower classification level, forming a 'parent node' on the higher classification level and a set of 'child nodes', or more detailed classification options, on the lower classification level. Due to such structuring, the relevance of the input records may be assessed at a desired tier of detail.

For this purpose, the input module 2 may include a memory storage module, such as a cloud storage system or a computer-readable storage medium (e.g., a non-transitory computer-readable storage medium). The computer-readable storage medium may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM);

erasable programmable memory (e.g., EPROM and EEPROM); flash memory; or electrical or other types of medium for storing such information/instructions.

The input module 2 may receive the hierarchical structure from any suitable source, including a memory storage device and/or a computing device. Similarly, the input module 2 may receive the input record from any suitable source, including a memory storage device, a computing device and/or one or more data capture systems configured to generate the set of input records. For example, a data capture system may be configured to generate a set of input records that includes said input record, in dependence on a respective event or transaction, and to output the set of input records to the input module 2.

The contextualizing module 4 is configured to process a database of historical records, i.e. records that have been received and/or processed previously, to determine relational data, which indicates that one or more contextual attributes are associated with respective nodes of the hierarchical structure.

In particular, the contextualizing module 4 may be configured to process the database of historical records using one or more data processing algorithms configured to establish relationships between the context of the historical records and the relevance of those historical records to the nodes of the hierarchical structure.

For this purpose, the database of historical records may include relevance data that is indicative of a historical relevance of each historical record to one or more nodes of the hierarchical structure and contextual data that is indicative of the context of each historical record, such as the time, date or set of historical records that said historical record was received in. The contextualizing module 4 may integrate such data into an ontology, such as a knowledge graph, to which a data processing algorithm, such as a semantic reasoning algorithm, may be applied to derive one or more contextual attributes that are related to respective nodes of the hierarchical structure. For example, the determined relational data may include a list of contextual attributes that are associated with respective nodes of the hierarchical structure. The list of contextual attributes may be determined based on trends, frequency counts, and/or other suitable metrics, for example.

In this manner, the contextualizing module 4 may determine that a contextual attribute describing a particular time of receipt, for example, is associated with a respective node of the hierarchical structure based on an accumulation of historical records that were received at that time having historical relevance to the same node.

The relevance of each contextual attribute to the respective nodes of the hierarchical structure may take the form of an n-ary classification for each of said nodes, such as a relevance score, or a binary classification for each of said nodes.

It shall be appreciated that the contextualizing module 4 may include a memory storage device configured to store the database of historical records, including the contextual data and the relevance data associated with the historical records.

The relevance assessment module 6 is configured to assess the relevance of the input record to the nodes of the hierarchical structure by determining relevance scores for a plurality of nodes of the hierarchical structure. The relevance score for each node may indicate the relevance, or relative relevance, of said node to the record content features of the input record.

For example, each relevance score may represent a probability that the input record relates to the respective node of the hierarchical structure. In this manner, differences between the relevance scores associated with respective input records can indicate that certain nodes are more or less relevant to one input record than another input record.

In an example, the relevance assessment module 6 is configured to determine a relevance score for some, but not all, of the nodes of the hierarchical structure in relation to the input record. For example, the relevance assessment module 6 may be configured to determine a relevance score of the input record for a plurality of nodes arranged at one or more desired classification levels of the hierarchical structure.

In another example, the classification system 1 may be advantageously configured to determine a relevance score of the input record for each node in the hierarchical structure, thereby providing a complete assessment of the relevance of the input record to the hierarchical structure.

As shall become clear, the relevance assessment module 6 may be configured to use one or more methods for determining the relevance score for each node and, advantageously, the relevance assessment module 6 may be configured to determine the relevance scores for one or more nodes of the hierarchical structure based, at least in part, on the relational data determined from the database of historical records. In particular, based on the relational data that relates the contextual attribute of the input record to one or more nodes of the hierarchical structure.

For this purpose, the relevance assessment module 6 may match the contextual attribute of the input record to a corresponding contextual attribute of the relational data and determine the relevance scores for one or more nodes of the hierarchical structure based, at least in part, on the indicated relevance of said nodes to the matched contextual attribute.

It shall be appreciated that the relevance score may be determined based, at least in part, on the indicated relevance of said nodes to the matched contextual attribute using one or more suitable methods or algorithms.

For example, the relevance assessment module 6 may include the relevance (indicated by the relational data) of the input record to a respective node of the hierarchical structure as an input or variable in an algorithm for determining the relevance scores. In another example, the relevance assessment module 6 may determine the relevance scores in stages and increase, or decrease, an initial relevance score, determined on the basis of the record content features, in dependence on the relevance of the input record to those nodes (as indicated by the relational data).

It shall be appreciated that conventional classification methods do not use the contextual attribute of the input record to classify an input record. In fact, this is because such contextual information is external to the record content features that describe the subject of the input record. However, in this classification system, the contextual attribute of the input record is used to determine the relevance scores because it describes the context of the input record, which can be used to infer, as opposed to explicitly determine, the relevance of the input record to the nodes of the hierarchical structure.

In this manner, the classification system is able to provide more accurate relevance scores and enhanced classification capabilities. Furthermore, since the context of the records is used in determining the relevance scores, irregular or otherwise anomalous input records may be advantageously classified into the hierarchical structure according to the context of occurrence of said records. Accordingly, such classification methods may provide enhanced classification capabilities.

The relevance assessment module 6 may also be configured to generate a relevance map for the input record based on the determined relevance scores. For example, the relevance map may include a copy of the hierarchical structure and the corresponding relevance scores determined for the nodes of the hierarchical structure. For example, the relevance map may include a relevance score for each node of the hierarchical structure associated with the input record. In this manner, the relevance map may provide a probabilistic map indicating the nodes of the hierarchical structure that are relevant to the input record.

It shall be appreciated that, in the following description, references to the relevance map for an input record are, in effect, interchangeable with references to the set of relevance scores that are associated with that input record.

The output module 8 is configured to receive the input record and the determined relevance map, or set of relevance scores, and to output a classification of the input record based on the determined relevance scores. For example, outputting a classification of the input record for one or more classification level. In this manner, the output module 8 may output a series of increasingly granular classifications of the input record, for example corresponding to respective classification options in successive levels of the hierarchical structure.

The technical benefit of the classification system 1 includes an efficiency gain through the reduction of the amount of inputs and outputs required to construct accurate rankings/classifications, and a computational improvement due to a reduction of the iterations required to classify the input records.

The operation of the classification system 1 shall now be described with additional reference to FIGS. 2 to 5.

Figure 2:
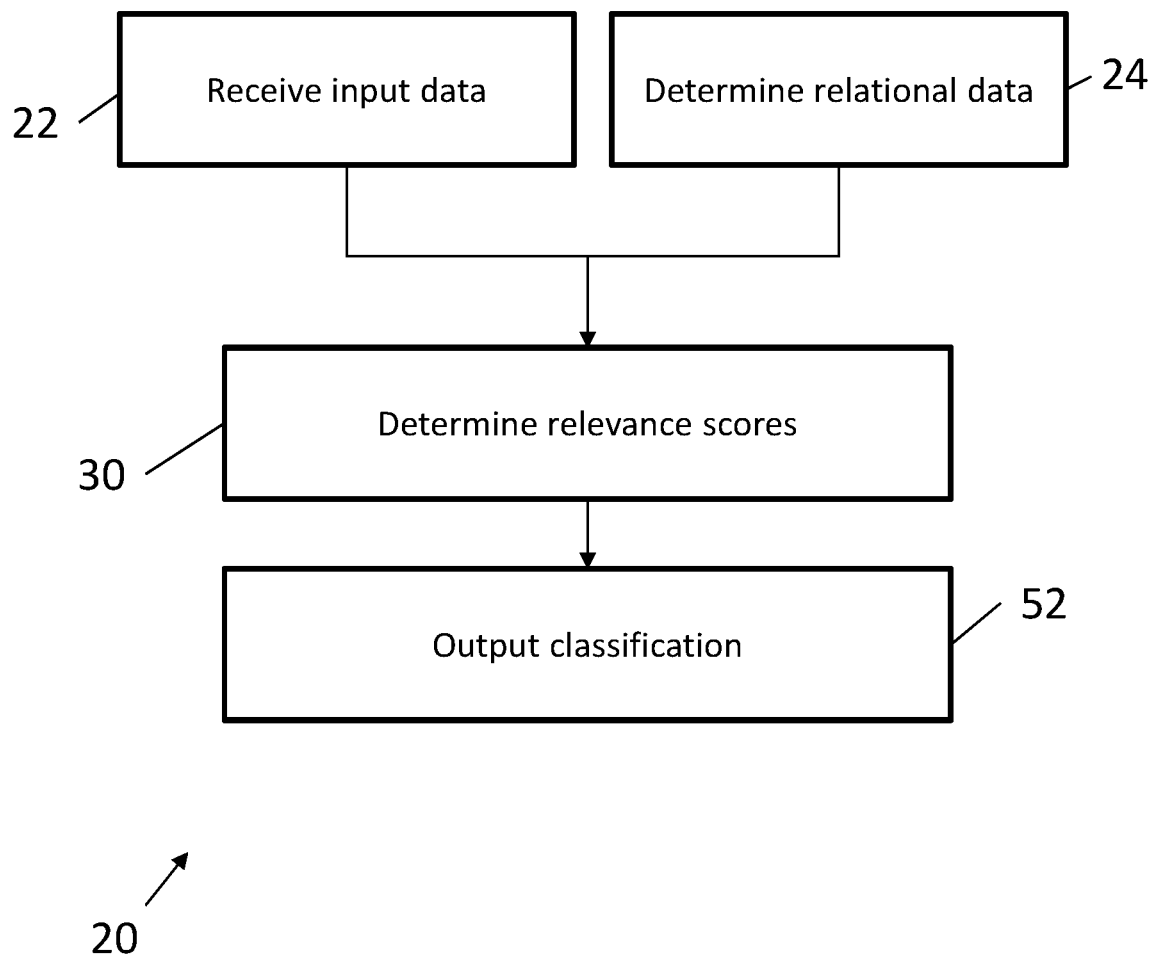
FIG. 2 schematically illustrates an example method in accordance with an embodiment of the disclosure of operating the classification system shown in FIG. 1.

FIG. 2 shows an example method 20 of operating the classification system 1 to classify an input record by its relevance to nodes of a hierarchical structure.

In step 22, the classification system 1 receives the input record, for comparison to the hierarchical structure; and the contextual attribute, which is indicative of the context of the receipt of the input record.

To provide context, the hierarchical structure may take the form of a tree that represents a taxonomy of objects. In one non-limiting example, the hierarchical structure includes nodes representing fastening elements, such as screws and washers, and nodes representing machinery, including nodes for washing machines, tumble dryers and dishwashers amongst other machines.

In this manner, the hierarchical structure may contain a subtree (or branch) corresponding to various types of screws, a subtree (or branch) corresponding to various types of washers, and a subtree (or branch) corresponding to various types of washing machines.

The input record may relate to a transaction and the input record may include one or more record content features describing the properties of a washer involved in the transaction. Such record content features may include the cost, stock and a class code for the washer that reads 'wash', for example.

The contextual attribute may indicate contextual information describing the circumstances in which the input record was generated, or received, at the classification system 1. For example, the contextual attribute may indicate that the input record was received with an accompanying input record in a set of input records relating to the transaction. Accordingly, the input record may form a first input record of the set of input records and the accompanying input record may form a second input record of the set of input records.

The second input record may include one or more record content features describing the properties of a screw, such as a sheet metal screw, involved in the transaction. Such record content features may include the dimensions, material, strength and identification of the sheet metal screw, for example.

It shall be appreciated that the classification system 1 may classify each of the first and second input records according to the classification method, substantially as described in the following steps. Hence, the contextual attribute for the second input record may indicate contextual information concerning the corresponding circumstances in which the second input record was generated, or received, at the classification system 1, including the fact that the second input record was received with the first input record.

It shall also be appreciated that this example is not intended to be limiting on the scope of the classification system 1.

The first and second input records may be received at and/or stored in the input module 2, for example having been determined by one or more computing devices or data capture systems. For example, the first and second input records may have been generated in response to a respective transaction or event involving the described objects.

The hierarchical structure may have been determined previously, for example on the basis of one or more user inputs, and the hierarchical structure may also be stored in, or otherwise received at, the input module 2, in step 22.

In step 22, the classification system 1 may also receive a desired classification level of the hierarchical structure for classifying the first and second input records. For example, the classification system 1 may receive one or more user inputs defining the desired classification level or the desired classification level may be stored in the input module 2, for example.

In this simplified example, the desired classification level of the hierarchical structure may include a first node that represents a washer, a second node that represents a washing machine and a third node that represents a screw.

In step 24, the classification system 1 is configured to determine relational data, based on the database of historical records, relating one or more contextual attributes to respective node(s) of the hierarchical structure.

The classification system 1 may use one or more methods for determining the relational data based on the database of historical records. Hence, it shall be appreciated that the following example is not intended to be limiting on the scope of the classification system 1.

In an example, the contextualizing module 4 may integrate the database of historical records into an ontology, such as a knowledge graph, to which a data processing algorithm, such as a semantic reasoning algorithm, may be applied to derive the relational data.

Figure 3:
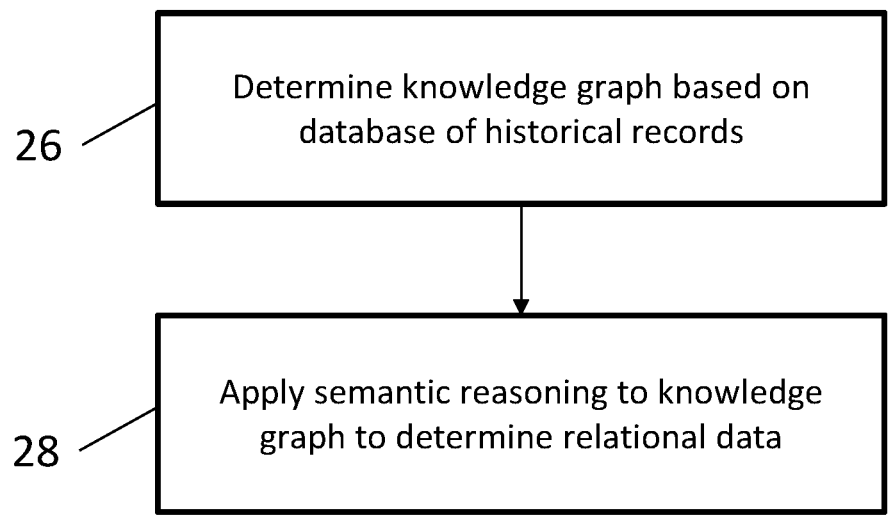
FIG. 3 schematically illustrates example sub-steps of a step in the method shown in FIG. 2.

Hence, the method 20 may include sub-steps 26 and 28, shown in FIG. 3, for determining the relational data, which shall now be described in more detail.

In sub-step 26, the contextualizing module 4 may determine a knowledge graph based on the database of historical records using one or more graph mapping algorithms configured to map the record content features, contextual data, and relevance data in the database of historical records, into a knowledge graph.

The knowledge graph organises the information in a manner that retains semantic knowledge, for example including similarity distance scores indicating the similarity of contextual data, relevance data and record content features.

Knowledge graphs are well known in the art of graph theory and are not discussed in more detail here to avoid obscuring the contribution of the present disclosure.

Nonetheless, to give an example, the contextualizing module 4 may split the database of historical records, including the record content features, contextual data, and the relevance data, into a triple of groups that includes a subject group, an object group, and a predicate group. The contextualizing module 4 may then populate a knowledge graph with the triple of groups to create an ontological knowledge base with semantic relations relating the groups together, for example.

In such a form, the knowledge graph may be suitable for logically deriving relational data that indicates that certain contextual attributes are related to respective nodes of the hierarchical structure.

In sub-step 28, the contextualizing module 4 may apply one or more semantic reasoning algorithms to the knowledge graph to determine the relational data.

Such semantic reasoning algorithms are not described in detail here, but it shall be appreciated that the semantic reasoning algorithms may use the subject, object and predicate groups of the knowledge graph to determine logic based relations between contextual attributes, derived from the contextual data in the database of historical records, and respective node(s) of the hierarchical structure.

The relationship between different nodes in the hierarchy may be hidden or otherwise unknown, and need to be inferred from other shared features. That is, commonalities between nodes in the hierarchy are inferred using the historical data that has been linked by way of the determined knowledge graph. The determined relational data may include a list of contextual attributes that are associated with respective nodes of the hierarchical structure, for example. The list of contextual attributes may be ranked based on a normalized frequency and/or a standardized frequency, for example.

To give an example, the determined relational data may relate a first contextual attribute of a received record to a node of the hierarchical structure that represents a washer. For said node to be contextually related to the received record, the first contextual attribute may indicate that the received record should have been received in a set of records with an accompanying record that is relevant to a node of the hierarchical structure that represents a screw.

Returning to FIG. 2, in step 30, the classification system 1 determines relevance scores for each input record.

The following description focuses on the steps involved in determining the relevance scores for the first input record. However, it shall be appreciated that relevance scores may be determined for the second input record in substantially the same manner.

As mentioned previously, the relevance assessment module 6 may be configured to use one or more methods for determining the relevance scores for the first input record and, hence, the following example is not intended to be limiting on the scope of the disclosure.

As shall become clear, in an example, the relevance assessment module 6 may determine the relevance scores in stages. For example, the relevance assessment module 6 may determine a set of initial relevance scores based on the record content features of the first input record. The relevance assessment module 6 may subsequently increase, or decrease, the initial relevance scores in dependence on the indicated contextual relevance of the first input record to those nodes, as provided by the relational data. Determining the relevance scores in this manner may advantageously minimise the processing requirements associated with determining the relevance scores for the nodes of the hierarchical structure.

Figure 4:
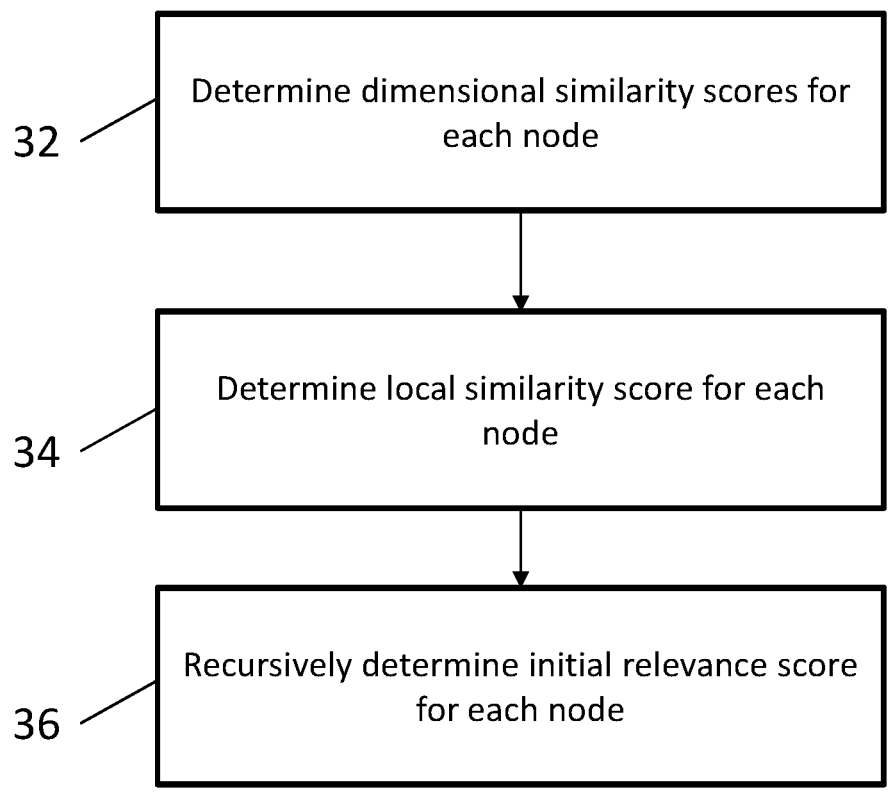
FIG. 4 schematically illustrates example sub-steps of another step in the method shown in FIG. 2.
Figure 5:
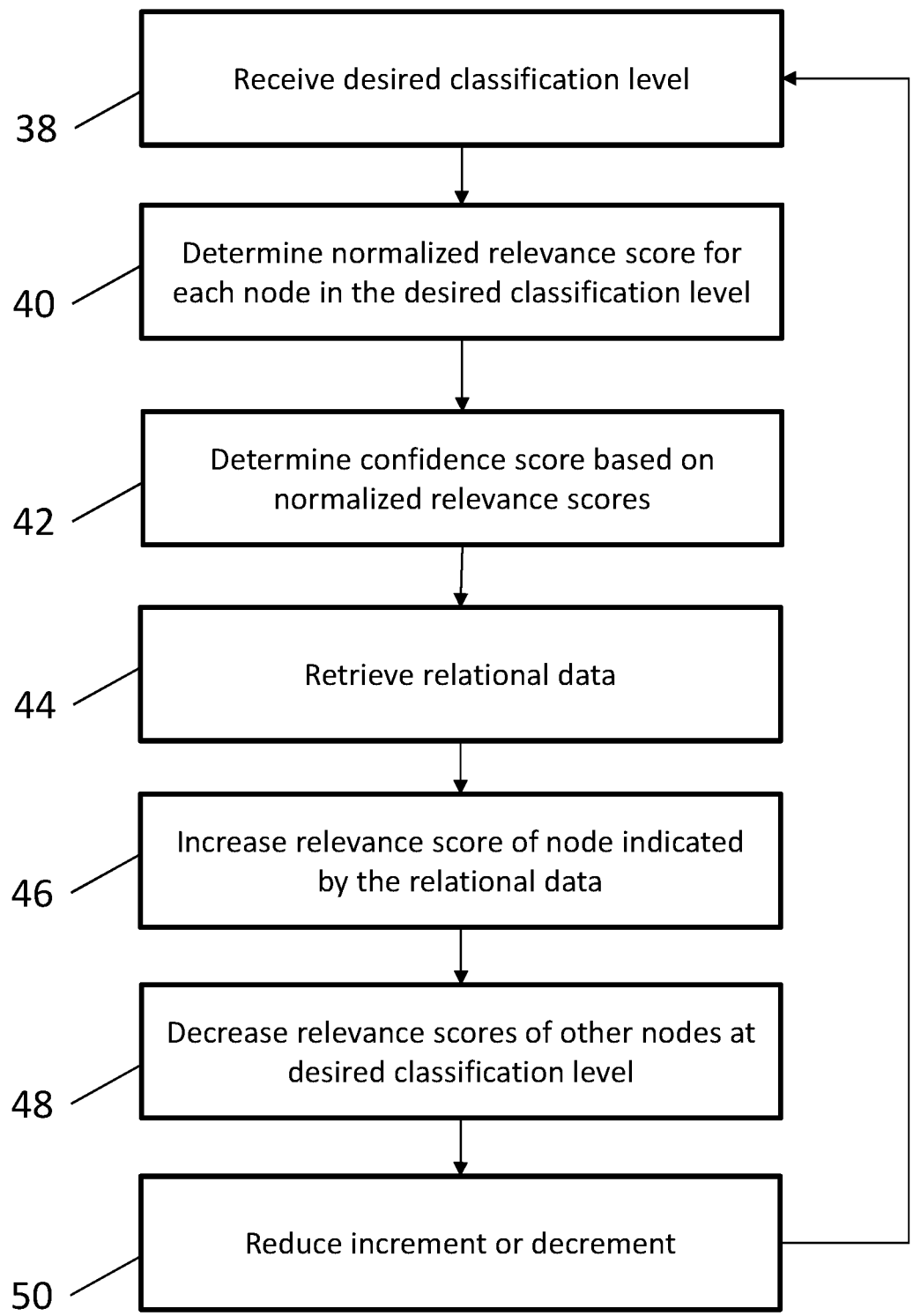
FIG. 5 schematically illustrates example sub-steps of a further step in the method shown in FIG. 2.

For this purpose, the method 20 may further include sub-steps 32 to 36, as shown in FIG. 4, for determining the initial relevance scores, and sub-steps 38 to 50, as shown in FIG. 5, for modifying the initial relevance scores, as will now be described in more detail below.

In this example, the relevance assessment module 6 is configured to determine a relevance score for each node of the hierarchical structure.

Accordingly, in sub-step 32 (shown in FIG. 4), the relevance assessment module 6 assesses the relevance of the first input record to each node of the hierarchical structure according to a respective dimension of assessment.

For example, the relevance assessment module 6 may determine, a dimensional similarity score, DS, for each node, N, of the hierarchical structure with respect to each record content feature (or assessed dimension, D) of the first input record.

It shall be appreciated that the dimensional similarity score may be determined by one or more methods for each node. For example, the computation of the dimensional similarity scores for each node may account for any matches between keywords, values or measurements extracted from the record content feature, and any keywords, values or measurements associated with the respective node.

Hence, in the non-limiting described example the relevance assessment module 6 may determine comparably high dimensional similarity scores for the first and second nodes of the hierarchical structure, relating to washers and washing machines respectively, based on the record content feature that includes the class code 'wash'. This is because the class code 'wash' could reasonably refer to a washer or a washing machine.

However, the relevance assessment module 6 may determine a much lower dimensional similarity score for the same record content feature with respect to the third node of the hierarchical structure, which relates to screws, as the class code 'wash' would not be applicable.

To give another example, the relevance assessment module 6 may determine a high dimensional similarity score for the first node, relating to washers, based on a record content feature that described a dimension of an object falling within a range of expected dimensions of a washer.

In sub-step 34, the relevance assessment module 6 may determine a local relevance or similarity score of the first input record for each node in the hierarchical structure based on the sum, or the weighted sum, of the dimensional similarity scores for that node. Weights used for determining the weighted sum of the dimensional similarity scores may be stored in the relevance assessment module 6 and the weights may vary for different levels of the hierarchical structure, for example.

In sub-step 36, the relevance assessment module 6 may determine the initial relevance score for each node in the hierarchical structure by propagating local similarity scores upwards in the hierarchy, from children nodes to parents. Accordingly, the initial relevance score of a parent node may be a combination between the local similarity score of the parent node and the aggregated local similarity scores of some, or all, of its child nodes.

For example, the relevance assessment module 6 may recursively determine the initial relevance score for each node based on the aggregate of the local similarity scores for that node and a selection of the child nodes depending from that node. For example, the selected child nodes may be the top K ranked child nodes on the basis of their local similarity scores, where K is a predetermined integer.

To demonstrate this, the following example describes the determination of the relevance scores for the first and second lowermost levels of the hierarchical structure.

First, the relevance assessment module 6 may determine the initial relevance score for each node on the lowest level of the hierarchical structure. The initial relevance score for each node on the lowest level of the hierarchical structure may be equal to the local similarity score for that node, since that node is at the end of a branch and no child nodes depend from that node.

To propagate the local similarity scores upwards in the hierarchical structure, the relevance assessment module 6 may then determine the initial relevance score for each node in the second level of the hierarchical structure by: i) ranking the child nodes depending from that node based on the relevance scores of said child nodes (i.e. rank those nodes depending form that node on the lowest level of the hierarchical structure); and adding together the local similarity score for that node and the determined initial relevance scores for the top K-ranked child nodes depending from that node.

The relevance assessment module 6 may then continue in this manner, to recursively determine the initial relevance scores for each node in the hierarchical structure, proceeding through the levels of the hierarchical structure in substantially the same manner.

In an example, once the initial relevance score has been determined for each node in the hierarchical structure, the relevance assessment module 6 may generate a relevance map for the first input record based on the hierarchical structure and the set of relevance scores determined for that input record.

It shall be appreciated that the relevance map provides a convenient combination of the hierarchical structure and the set of relevance scores for efficient data handling.

With reference to the desired classification level, the relevance assessment system 6 may determine a high initial relevance score for the first node, relating to washers, and a comparably high initial relevance score for the second node, relating to washing machines. However, the relevance assessment system 6 may determine a relatively low initial relevance score for a third node, relating to screws.

Furthermore, although not described in detail, it shall be appreciated that the record content features of the second input record clearly relate to screws and, hence the relevance assessment system 6 may determine a high relevance score of the second input record for the third node and a low relevance score for each of the first and second nodes.

In this manner, the relevance scores for each input record represent the scale of relevance of the respective input record to the nodes of the hierarchical structure (from most relevant to least relevant).

However, although it may be clear that the first input record is not particularly relevant to the screw nodes, it is less clear whether the first input record relates to washers or washing machines. Hence, there may be substantial uncertainty in one or more of the relevance scores due to the ambiguous nature of the record content features, such as the text 'wash', in this example, which could refer to either a washer or a washing machine.

To reduce this uncertainty, the classification system 1 may be configured to use the relational data to refine the initial relevance scores and the classification system 1 may focus on improving those initial relevance scores with the greatest uncertainty or those initial relevance scores for the nodes at the desired classification level.

By way of example, in sub-steps 38 to 50 (shown in FIG. 5), the classification system 1 may evaluate the confidence in the relevance scores determined for each input record at the desired classification level of the hierarchical structure.

The confidence in the determined relevance scores at the desired classification level may be evaluated by determining a confidence score for each input record.

The confidence score is indicative of the relative assurance that the determined relevance scores for that input record are accurate, with a high confidence score indicating that there is low uncertainty in the determined relevance scores, whilst a low confidence score indicates that there is high uncertainty in the determined relevance scores.

It shall be appreciated that one or more methods may be used for determining such confidence scores.

To give an example, in sub-step 38, the relevance assessment module 6 may receive the desired classification level corresponding to a level of nodes in the hierarchical structure.

In sub-step 40, the relevance assessment module 6 may determine a normalized relevance score of each input record for each node in the desired classification level. The normalized relevance score of each input record may be determined for each node by dividing the initial relevance score for that node by a total relevance score for the desired classification level. The total relevance score for the desired classification level may be calculated by summing the initial relevance scores of the nodes at the desired classification level together.

In sub-step 42, the relevance assessment module 6 may determine a confidence score for each input record using one or more confidence assessment algorithms based on the normalized relevance scores for the nodes at the desired classification level.

For example, the relevance assessment module 6 may use a Shannon entropy formula to determine the confidence score for each input record based on the positive (non-zero) normalized relevance scores of the nodes at the desired classification level.

It shall be appreciated that the Shannon entropy formula is well-known in the art of information theory and is not described in detail here to avoid obscuring the method.

Nonetheless, for the sake of clarity, the Shannon entropy formula may be applied as:

$$\text{Confidence} = 1 - (-\Sigma_1^i P\_i \times \log P\_i) = 1 + (\Sigma_1^i P\_i \times \log P\_i)$$

where $P\_i$ are the normalized relevance scores of each node, $i$, at the desired classification level with a positive relevance score. It shall be appreciated that the confidence score takes positive values no greater than 1.

It shall be appreciated that, in other examples, this method of evaluating the confidence in the determined relevance scores could be repeated for each classification level of the hierarchical structure.

Furthermore, where the hierarchical structure includes multiple connected components (i.e. a forest), the confidence score may be determined, according to sub-steps 38 to 42 described above, for each connected component (i.e. for each tree or directed acyclic graph), and the overall confidence score for the input record may be determined as the minimum confidence score determined for the various connected components.

To return to the earlier example, the relevance assessment module 6 may determine a relatively low confidence score for the first input record at the desired classification level, since the relevance scores for the first and second nodes are comparably high, due to the ambiguous record content feature. This means that the classification system is unable to classify the first input record as relating to a washer or a washing machine with much confidence.

Meanwhile, the relevance assessment module 6 may determine a high confidence score for the relevance scores of the second input record at the desired classification level, since a high relevance score was determined for the third node and low relevance scores were determined for the first and second nodes.

As shall become clear, the classification system 1 may then use such confidence scores to refine the determined relevance scores.

In sub-step 44, the classification system 1 may retrieve relational data associated with the contextual attribute of the first input record in order to refine the relevance scores.

As mentioned previously, the relational data is indicative that one or more contextual attributes are related to respective nodes of the hierarchical structure. In this example, the relational data may indicate that a record relating to a 'screw' is frequently accompanied by another record relating to a 'washer'. For example, such relational data may have been determined from the database of historical records if: i) the database of historical records included multiple pairs of records that were received in respective sets; and ii) one record in each set was highly relevant to the 'screw' and the other record in each set was highly relevant to the 'washer'.

Hence, if a contextual attribute indicated that an input record was received with an accompanying input record that is relevant to the third node, representing screws, then the relational data may indicate that the input record is related, by its context, to the first node, representing washers, and vice versa.

Accordingly, in sub-step 44, the relevance assessment module 6 may match the contextual attribute of the first input record to the relational data and identify a corresponding relationship between the first input record and the first node, relating to washers.

Such a relationship may be identified on the basis that: i) the first input record was received with the second input record; ii) the second input record is most relevant to the third node, relating to screws, which the relational data concerns; iii) the confidence score for the first input record is low, whilst the confidence score of the second input record is high; and iv) the first node, relating to washers, is one of the nodes for which the first input record has the highest relevance scores.

The identified relationship between the first input record and the first node may subsequently be used to adjust the initial relevance scores for the first input record. In this manner, the classification system 1 may use the determined contextual relation between the 'screw' and the 'washer' nodes to adjust the initial relevance scores for the first input record.

In another example, the database of historical records may include a plurality of records received in successive days at the same time and from the same source, e.g. at 7 am from a particular shop. Each of these historical records may be highly relevant to the first node, relating to washers, and so the relational data may indicate that records received at that time, from that source, are contextually related to the 'washer'.

Accordingly, if the contextual attribute indicated that the first input record was received at 7 am, from that shop, the relational data would indicate that the first input record is related, by its context, to the first node. Accordingly, the contextual attribute would relate the first input record to the first node, and this relationship would be used to adjust the initial relevance scores.

The classification system 1 may subsequently use one or more methods for updating the initial relevance scores based on the nodes indicated by the relational data.

For example, the method 20 may include sub-steps 46 to 50 for refining the initial relevance scores of the input records.

The following description relates to the steps taken to refine the relevance scores at a desired classification level for the first input record but it shall be appreciated that the same steps may be repeated, mutatis mutandis, as necessary for the second input record.

In sub-step 46, the relevance assessment module 6 may increase the relevance score of the node indicated by the relational data based on the contextual attribute of the input record. For example, the relevance assessment module 6 may increase the relevance score of the most relevant node indicated by the relational data by a predetermined value, $\alpha$. In this example, the relevance assessment module 6 may therefore increase the relevance score of the first node, relating to washers, by $\alpha$.

In sub-step 48, the relevance assessment module 6 may decrease the relevance score of the other nodes at the desired classification level of the hierarchical structure. For example, the update module may decrease the relevance score of each of the other nodes by a predetermined value, $\beta$. Hence, in this example, the relevance assessment module 6 may decrease the relevance scores of the second node, relating to washing machines, and the third node, relating to screws, by β. It shall be appreciated that β may be equal to α.

In sub-step 50, the relevance assessment module 6 may then repeat sub-steps 38 to 48, as many times as necessary, reducing the α and/or β values with each iteration, until the α and/or β values are less than a respective threshold.

In this manner, the relevance assessment module 6 effectively reduces the uncertainty in the relevance scores for the first input record based on the previously determined relevance of the database of historical records. Hence, relevance knowledge is effectively transferred from historical records (that may have included less ambiguous record content features) to the input records based on a shared context of occurrence that logically links the records together.

Returning to FIG. 2, in step 52, the classification system 1 may classify the input records according to the classification options of the hierarchical structure based on the determined relevance scores.

For example, the output module 8 may classify the first input record as relating to a washer, since the largest relevance score at the desired classification level was determined for the first node. Similarly, the output module 8 may classify the second input record as relating to a screw.

In this manner, the classification system 1 is able to classify an ambiguous set of input records according to a hierarchical structure, or classification scheme, and the output module 8 may output such classifications for efficient processing and/or storage of the input records, for example.

Many modifications may be made to the above-described example without departing from the scope of the appended claims.

In another example, the input record may take the form of an image and the classification system 1 may be used as part of an image classification system to classify the contents of the image according to a hierarchical structure. In which case, the record content features may take the form of pixels and the classification system 1 may include one or more image processing algorithms for determining the initial relevance scores, in sub-steps 32 to 36, based on the pixels. The classification system may then use the contextual attribute for the input record, such as an image set that the image was received in, to refine the initial relevance scores, in sub-steps 38 to 50, and reduce the uncertainty in the image classification. Such an image classification system could be used as a vision system with, for instance, a robot or robotic arm, in order that context derivable from the surroundings can be considered. In image or vision classification, enhancing image captioning text extracted and inferred from images is also an option.

In another example, the relevance assessment module 6 may only refine the initial relevance scores, in sub-steps 44 to 50, for those input records for which the confidence score is less than a confidence threshold. There is significant uncertainty in the initial relevance scores determined for those input records and further refinement of those initial relevance scores is required using the contextual attribute and the relational data. Accordingly, the relevance assessment module 6 may compare the determined confidence score for each input record to the confidence threshold in sub-step 43, prior to refining the initial relevance scores using the relational data, in sub-steps 44 to 50.

Once the initial relevance scores have been refined, in step 50, the process may be iteratively repeated until the confidence score for said input record is greater than or equal to the threshold confidence level.

Those input records for which the confidence score is greater than or equal to the confidence threshold may be deemed sufficiently accurate and the relevance scores for said input records may be output to the output module 8.

In another example, the relevance assessment module 6 may refine the initial relevance scores using the relational data, substantially as described in steps 44 to 50, but the initial relevance scores of the nodes at the desired classification level may be increased/decreased in dependence on the relative relevance of the contextual attribute to those nodes. For example, the relevance assessment module 6 may increase/decrease the initial relevance scores proportionately to the relative relevance of the contextual attribute to said nodes, as indicated by the relational data for example in the form of historical relevance scores for said nodes.

In relation to this, it shall be appreciated that the relational data described in the example above is binary, i.e. (screw, washer), but in other examples higher-dimensional relations are possible.

In another example, the classification system 1 may be configured to refine the initial relevance scores for each classification level of the hierarchical structure based on the relational data, substantially as described in sub-steps 38 to 50.

Furthermore, in step 52, the output module 8 may output a series of increasingly granular classifications, corresponding to respective nodes, in successive classification levels of the hierarchical structure.

The invention claimed is:

1. A computer-implemented classification method for classifying records by relevance to nodes of a hierarchical structure representative of a classification scheme for a plurality of classification options, the classification method comprising:
   receiving an input record having a plurality of record content features, and a contextual attribute indicative of a context of the receipt of the input record;
   generating a knowledge graph by splitting a database of historical records, which comprises splitting record content features, contextual data, and relevance data of the database, into a triple of groups, the knowledge graph populated with the triple of groups to generate an ontological knowledge base with semantic relations relating the groups together;
   determining relational data based on the database of historical records by applying an ontological engineering algorithm to the knowledge graph that models a relevance of contextual attributes of the historical records to the nodes of the hierarchical structure;
   retrieving the relational data indicative of one or more nodes of the hierarchical structure that are associated with the contextual attribute of the received input record;
   determining a relevance score for one or more of the nodes of the hierarchical structure to classify the input record, wherein the relevance score of each of the one or more nodes is determined in dependence on a comparison of the plurality of record content features of the input record relative to the classification option represented by said node, and further wherein the relevance score of each of the one or more nodes is determined in dependence on the retrieved relational data; and
   outputting a classification of the input record based on the determined relevance score for one or more of the nodes of the hierarchical structure.

2. The computer-implemented classification method according to claim 1, wherein the relational data is further determined by applying a semantic reasoning algorithm to the knowledge graph to determine a set of contextual attributes that are logically related to respective nodes of the hierarchical structure, wherein the set of contextual attributes defines one or more contextual parameters, the one or more contextual parameters comprising a source of the input record, a time and/or data of generation or receipt of the input record, and one or more other input records received with the input record.

3. The computer-implemented classification method according to claim 2, wherein the relational data is retrieved in dependence on matching the contextual attribute of the input record to a corresponding contextual attribute selected from the set of contextual attributes determined by the semantic reasoning algorithm.

4. The computer-implemented classification method according to claim 1, wherein the triple of groups comprises subject groups, object groups, and predicate groups, which are semantically related.

5. The computer-implemented classification method according to claim 1, wherein determining the relevance score of each of the one or more nodes comprises:
  determining an initial relevance score in dependence on the comparison of the plurality of record content features of the input record relative to the classification option represented by said node; and
  by updating that initial relevance score based on the retrieved relational data.

6. The computer-implemented classification method according to claim 5, wherein increasing, or decreasing, the initial relevance score based on the retrieved relational data comprises:
  increasing the initial relevance score of a first node at a desired classification level of the hierarchical structure in dependence on the relational data being indicative that the first node is associated with the contextual attribute of the received input record; and
  decreasing the initial relevance score for a second node, different from the first node, at the desired classification level.

7. The computer-implemented classification method according to claim 1, wherein determining the relevance score of each of the one or more nodes comprises:
  determining a confidence score for the input record that is indicative of an uncertainty in the initial relevance scores;
  comparing the determined confidence score for the input record to a confidence threshold; and
  updating the initial relevance scores based on the determined confidence score being less than the confidence threshold.

8. The computer-implemented classification method according to claim 1, wherein the relevance score for the one or more of the nodes of the hierarchical structure is determined based, at least in part, on a combination of a local similarity score for that node and a local similarity score for one or more child nodes depending from that node, each local similarity score being indicative of the relevance of the input record to the respective node.

9. A non-transitory, computer-readable storage medium having instructions stored thereon that, when executed by a computer, cause the computer to carry out the computer-implemented classification method of claim 1.

10. A classification system for classifying records by relevance to nodes of a hierarchical structure representative of a classification scheme for a plurality of classification options, the classification system comprising one or more processors configured to:
  receive an input record having a plurality of record content features, and receive a contextual attribute indicative of a context of the receipt of the input record;
  generate a knowledge graph by splitting a database of historical records, which comprises splitting record content features, contextual data, and relevance data of the database, into a triple of groups, the knowledge graph being populated with the triple of groups to generate an ontological knowledge base with semantic relations relating the groups together, and
  determine relational data based on the database of historical records by applying an ontological engineering algorithm to the knowledge graph that models a relevance of contextual attributes of the historical records to the nodes of the hierarchical structure;
  determine a relevance score for one or more of the nodes of the hierarchical structure to classify the input record, wherein the relevance score of each of the one or more nodes is determined in dependence on a comparison of the plurality of record content features of the input record relative to the classification option represented by said node, and further wherein the relevance score of each of the one or more nodes is determined in dependence on retrieved relational data, determined by the contextualizing module, that is indicative of one or more nodes of the hierarchical structure that are associated with the contextual attribute of the received input record; and
  output a classification of the input record based on the determined relevance score for one or more of the nodes of the hierarchical structure.

11. The classification system according to claim 10, the one or more processors is further configured to determine the relational data by applying a semantic reasoning algorithm to the knowledge graph to determine a set of contextual attributes that are logically related to respective nodes of the hierarchical structure.

12. The classification system according to claim 11, the one or more processors is further configured to retrieve the relational data in dependence on matching the contextual attribute of the input record to a corresponding contextual attribute selected from the set of contextual attributes determined by the semantic reasoning algorithm.

* * * * *